Feb. 1, 1927.  
E. ROIRANT  
1,615,886  
PROCESS OF COLLECTING GLASS BY SUCTION  
Filed July 9, 1926
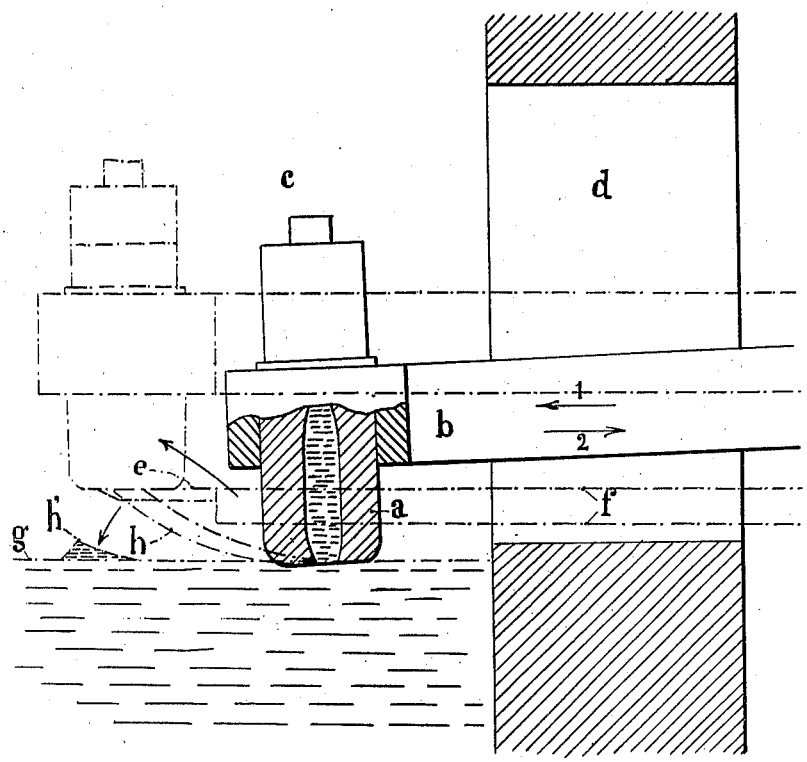
Inventor  
Emile Roirant,  
per  
Attorney.

Patented Feb. 1, 1927.

1,615,886

UNITED STATES PATENT OFFICE.

EMILE ROIRANT, OF PARIS, FRANCE, ASSIGNOR TO SOCIETE ANONYME D'ETUDES ET DE CONSTRUCTIONS D'APPAREILS MECANIQUES POUR LA VERRERIE, OF PARIS, FRANCE.

PROCESS OF COLLECTING GLASS BY SUCTION.

Application filed July 9, 1926, Serial No. 121,408, and in France March 3, 1926.

In certain machines for manufacturing bottles it has already been proposed to cause parison moulds to penetrate into the interior of a furnace containing the glass in fusion, which moulds draw therein by suction the glass in a zone near to the interior wall of this furnace.

In this process the parison mould constantly sucks up the glass in the same spot, then withdraws towards the exterior of the furnace carrying with it a column of glass which adheres to its base and which, after having been cut off, falls back between the point of suction and the interior wall of the furnace. The glass thus carried, already cooled by metallic contact, is then rejected into a zone less hot where it has difficulty in acquiring again a suitable temperature.

In order to remedy this inconvenience, different means have been employed which cause other difficulties or which do not comply entirely with technical conditions desirable in a process comprising the suction of glass into a parison mould.

It has been suggested to draw the glass in different parts of the furnace by successive movements of the parison moulds.

In addition to the mechanical difficulties which this method involves, it is certain that at each spot where the drawing takes place there is found glass having a different temperature, which causes difficulties in the manufacture.

It has likewise been suggested in other machines causing a rectilinear penetration of the parison mould into the furnace, to cut off the glass carried by the mould after suction and to endeavour to project it laterally with respect to the direction of penetration, but apart from the complication which thereby results for the cutting off apparatus, the rejection of the glass does not take place sufficiently far on order to avoid all disturbance of temperature of the glass at the suction point.

In addition the glass cut off is not rejected into a hotter zone than the zone where it is sucked up, and cannot therefore be reheated sufficiently rapidly.

It is necessary to state that in order to obtain a perfect manufacture, the parison mould ought to be filled with glass having a regular fluidity, that is to say, in which all the parts are at the same temperature. Now the zone of suction of the parison mould is not limited to one point or to the small surface which corresponds to the cavity of the parison mould, it extends equally circumferentially around this cavity and over a certain distance.

As in a furnace the temperature of the glass increases rapidly from the part immediately next to the wall towards the interior, it follows that the suction mould absorbs glass which is hotter on the side of the interior of the furnace than on the side at the exterior. The rejection of glass cut off to the right or to the left or to the rear of the mould accentuates the differences of temperature of the glass in the zone where it is gathered; it follows that the parisons obtained are different in temperature and that the object manufactured presents defects.

The present invention has for its object a process which has for its purpose to prevent the various inconveniences indicated, and to render the temperature of the glass uniform at the spot where it is sucked up, whilst facilitating the cutting off of the glass carried by the base of the suction mould after suction.

This process consists in principle, after the suction mould has effected its suction and has been raised above the surface of the glass, to cause this suction mould to continue its path in a direction towards the interior of the furnace, to cut off the glass at the end of this new path of penetration and in the direction of the travel of the glass carried by the base of the mould, then to operate the withdrawal of this mould to the exterior of the furnace.

This process has the result of carrying the glass adhering to the base of the mould towards the interior of the furnace in such a manner that after the cutting off, the glass cooled by the contact of the mould and the cutting off, is rejected towards the interior, that is to say, towards the hottest side.

The annexed drawing given by way of example only, represents in a manner which is entirely diagrammatic, the movement of the suction mould and of the blade.

The suction mould $a$ is carried by an arm

*b* having longitudinal movements capable of causing the mould to penetrate to the interior of the furnace *c*, through an opening *d* and being able also to take falling and rising movements. These various movements are produced by any suitable mechanical means. The arm *b* contains or carries the suction tubing.

The blade *e* is carried by an arm *f* capable of receiving a longitudinal movement.

The operation is as follows:

The arm *b* moves in the direction of the arrow 1 and thus causes the mould *a* to penetrate into the interior of the furnace *c*. It is lowered carrying the base of the suction mould into contact with the surface *g* of the smelted glass. The suction is then produced and the mould fills with glass. It is raised and continues to advance towards the interior of the furnace in the direction of the arrow 1, drawing a column *h* of glass adhering to its base. When it arrives in the position indicated in dot and dash lines, the blade *e* penetrates into the furnace, passes under the mould and cuts the glass which falls at *h*¹.

The mould *a* and the blade *e* then move in the direction of the arrow 2 and leave the furnace.

It is therefore seen that the column *h* of glass which is carried, partly cooled, falls into a hotter zone than that where the mould arrived to collect the glass, which tends to regulate the temperature in the whole of the collecting zone, because the glass which is less hot which is between the point of collection and the wall of the furnace is not influenced, whilst the hotter glass beyond the point of suction is cooled by the portion of glass cut off which has been subjected to a metallic contact.

Further, the glass carried by the base of the suction mould presents a favourable inclination to the cut of the blade, by reason of the fact that the column of glass makes an acute angle with respect to the direction of the cut. It is evident that this method of attack is particularly advantages in order to effect under good conditions the severance of the glass which is at this moment in a plastic state.

It has also to be noted that the cutting operated in the direction of the further movement of the parison mould, assists in a certain measure in throwing the column of glass towards the interior of the furnace.

The arrangements above described are only given by way of example; the forms, dimensions, materials employed and all the details of construction, and putting into operation of the process may be varied in all cases without changing the principle of the invention.

Claim:—

A process of collecting glass by suction by means of a suction mould which penetrates into the furnace, characterized by the fact that this mould, after having effected its suction, continues its movement towards the interior of the furnace; the blade effecting the cutting off at the end of this supplementary travel, so that the column cut off falls back towards the side of the interior of the furnace.

The foregoing specification of my "process of collecting glass by suction" signed by me this 28th day of June, 1926.

EMILE ROIRANT.